United States Patent [19]

Cooper

[11] 4,391,950
[45] Jul. 5, 1983

[54] POLYPHENYLENE ETHER COMPOSITION AND PROCESS FOR PRODUCTION

[75] Inventor: Glenn D. Cooper, Delmar, N.Y.

[73] Assignee: General Electric Company, Pittsfield, Mass.

[21] Appl. No.: 298,534

[22] Filed: Sep. 2, 1981

[51] Int. Cl.³ .............................................. C08G 65/44
[52] U.S. Cl. .................................. 525/132; 524/292; 525/152; 525/534; 528/212; 528/218; 528/219
[58] Field of Search ................. 525/534; 524/292; 528/212, 218, 219

[56] References Cited

U.S. PATENT DOCUMENTS

| | | | |
|---|---|---|---|
| 3,257,357 | 6/1966 | Stamatoff | 528/212 |
| 3,257,358 | 6/1966 | Stamatoff | 528/212 |
| 3,306,874 | 2/1967 | Hay | 528/212 |
| 3,306,875 | 2/1967 | Hay | 528/212 |
| 3,383,435 | 5/1968 | Cizek | 525/534 |
| 4,058,504 | 11/1977 | Yonemitsu et al. | 525/534 |

*Primary Examiner*—Lester L. Lee
*Attorney, Agent, or Firm*—Hedman, Casella, Gibson, Costigan & Hoare

[57] ABSTRACT

An improved polyphenylene ether composition and process for production are disclosed. Benzoic anhydride is reacted with polyphenylene ether polymer, preferably under conditions of extrusion, to produce a composition having improved color and/or color stability.

16 Claims, No Drawings

POLYPHENYLENE ETHER COMPOSITION AND PROCESS FOR PRODUCTION

BACKGROUND OF THE INVENTION

Polyphenylene ethers (or oxides) are known and described in numerous publications including U.S. Pat. Nos. 3,306,874 and 3,306,875 of Allan S. Hay and U.S. Pat. Nos. 3,257,357 and 3,257,358 of Gelu Stamatoff. The high molecular weight polymers are high performance engineering thermoplastics possessing relatively high melt viscosities and softening points—i.e., in excess of 275° C.—and are useful alone and in combination with other polymers—for many commercial applications requiring high temperature resistance including formation of film, fiber and molded articles.

These polymers may be produced by the oxidative coupling of suitable phenolic monomers. This may be accomplished utilizing oxygen and a catalyst such as copper-amine complex, or by a catalyst such as manganese bis(benzoin oxime) in a basic reaction medium.

One such process for producing these polymers involves polymerization in a biphasic system. Two immiscible liquid phases are involved. One is normally aqueous; the other, aromatic organic. Oxygen, oxidative catalyst, monomer and any desired additional ingredients are dispersed in the basic system, with individual ingredients being preferentially disposed in one or the other of the phases. In an alternative process, a single phase system is employed. In both such processes the polymerization reaction proceeds exothermically, usually under some agitation of the system.

Upon completion of the polymerization reaction, the polyphenylene ether polymer is isolated from the reaction medium. This may be accomplished by various known means. For example, a water soluble organic liquid such as methanol or acetone may be added to the reaction medium or steam may be injected into that medium. In either instance, the polymer precipitates and is readily separated from the supernatant liquid medium.

Another common step in the production of polyphenylene ether involves decolorization. This step may be accomplished by catalytic hydrogenation of the polymer. Alternatively or additionally, the polymer may be decolorized by passing the solution through a column packed with alumina or other suitable adsorbant to remove the colored impurities. Similarly, a reducing agent such as hypophosphorous acid may be employed for decolorization. Decolorization is ordinarily performed prior to isolation and while the polymer is still dissolved in the reaction medium. It results in polymer compositions having a more desirable appearance.

While the high performance properties of polyphenylene ethers are most desirable, their relatively high melt viscosities and softening points are often a disadvantage. For example, although they may be employed to produce superior molded articles by melt processing techniques, the high temperatures required are undesirable.

Because of this disadvantage, polyphenylene ethers are often combined with other resins for commercial use. One such resultant class of compound compositions is described in U.S. Pat. No. 3,383,435 of Eric P. Cizek. Those compositions, containing polyphenylene ether (or oxide) in admixture with polyalkenyl aromatic resin are generally employed in the production of molded and/or extruded articles.

It is known in the art that various of the properties of these compound compositions may be further improved by copolymerizing the alkenyl aromatics with other monomers or by blending with other resins. Modifiers such as butadiene, for example, are customarily incorporated into the polyalkenyl aromatic resins to improve the properties of the resultant compositions. Such modified resins provide means for overcoming various physical drawbacks of alkenyl aromatic resins, particularly polystyrene, while simultaneously facilitating the processing of polyphenylene ethers.

As is described in the art, butadiene modification of polyalkenyl aromatic resins may take many forms. Polybutadiene or copolymers partially derived from butadiene may be graft, block or otherwise polymerized with such alkenyl aromatic resins. The resultant product may also be unsaturated or saturated (for example, by subsequent hydrogenation) without loss of desirability.

Despite the foregoing hydrogenation step and compounding with other polymers, polyphenylene ether compositions often exhibit undesirable color and/or color stability. This may lead to loss of consumer acceptability or to dissatisfaction with appearance. As a result, polyphenylene ether compositions having improved color properties remain highly desirable.

INTRODUCTION TO THE INVENTION

In accordance with the present invention, polyphenylene ether compositions having improved properties including color and/or color stability are obtained. This is accomplished by reacting the polyphenylene ether polymer with benzoic anhydride.

The desired reaction product may most readily be obtained by admixing polyphenylene ether with from 0.1 to 2% by weight of benzoic anhydride and subjecting that admixture to treatment at a temperature of from 200° to 500° C. The reaction occurs quickly and results in the present, improved thermoplastic compositions.

DESCRIPTION OF THE INVENTION

The preferred polyphenylene ethers for the present compositions are homo- and copolymers of the formula:

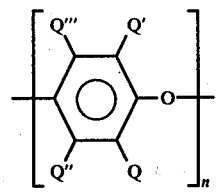

wherein Q, Q', Q", and Q''' are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q' and Q" and Q''' in addition may be halogen with the proviso that Q and Q' are preferably free of a tertiary carbon atoms; and n represents the total number of monomer residues and is an integer of at least 50.

Especially preferred is poly(2,6-dimethyl-1,4-phenylene)ether.

The present polymer may be produced by any conventional method. This normally involves the oxidative coupling of suitable monomer in an organic or mixed aqueous-organic medium.

After formation, it is preferred to decolorize the polymer. This step may be performed by conventional techniques including catalytic hydrogenation, adsorption and/or a reducing agent. Decolorization generally takes place while the polymer is still in the reaction medium in which it is formed.

Isolation of solid polyphenylene ether polymer may also be performed by any conventional means. Although these means offer distinct processing advantages and may differently affect the color and color properties of separated polymer, in each instance reaction with benzoic anhydride yields an overall improvement.

For example, steam or water precipitation, spray-drying and other total isolation processes are particularly energy efficient but usually require decolorization to produce desirable product. Methanol induced isolation, on the other hand, frequently need not be performed in conjunction with decolorization to yield a low color product. Moreover, this technique often contributes to a higher degree of color stability than total isolation processes. Selection of a process which will optimize the advantages of the present invention for any given polymer composition is, however, readily determinable on a case-by-case basis.

Reaction of the polymer with benzoic anhydride is readily accomplished. All that is required for the objectives of the present invention is that the polyphenylene ether and benzoic anhydride be admixed and then subjected to a treatment temperature of from 200° to 500° C. The reaction itself is virtually instantaneous.

In a preferred embodiment, this treatment is performed by extruding the admixture. Accordingly, solid polyphenylene ether (the processing of which would normally include such a step) is simply admixed with benzoic anhydride prior to extrusion under the foregoing temperature conditions.

Only a very minor amount of benzoic anhydride is required for this reaction. Desirably, from 0.05 to 5%, more preferably from 1 to 3% of benzoic anhydride is employed by weight of polyphenylene ether polymer.

While it is not wished to be bound by such theory, it is believed that the present treatment and reaction involve the formation of benzoate esters from residual phenolic hydroxyl groups on the polymer. This would explain at least the decreased susceptibility of the present polymers to subsequent color-producing oxidative reactions. Even so, however, this theory does not fully account for the initial, more colorless appearance of many of the present polyphenylene ether compositions or increases in such physical properties as ductility.

The improved polyphenylene ether compositions of this invention may be utilized in any conventional manner. This includes the preparation of compound compositions containing other polymers. Of these other polymers, by far the most important commercially are polyalkenyl aromatic resins.

These polyalkenyl aromatic resins are themselves well known and are preferably derived from monomers of the formula:

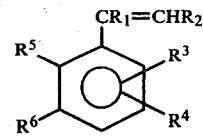

wherein $R^1$ and $R^2$ are selected from the group consisting of lower alkyl or alkenyl groups of from 1 to 6 hydrogen. $R^3$ and $R^4$ are selected from the group consisting of chloro, bromo, hydrogen and lower alkyl of from 1 to 6 carbon atoms. $R^5$ and $R^6$ are selected from the group consisting of hydrogen, halogen and lower alkyl and alkenyl groups of from 1 to 6 carbon atoms or $R^5$ and $R^6$ may be concatenated together with hydrocarbyl groups to form a naphthyl group.

Specific examples of preferred polyalkenyl aromatic monomers include styrene, chlorostyrene, alpha-methylstyrene, vinyl xylene, divinyl-benzene and vinyl naphthalene.

These components of the present compositions may be admixed in any proportion. Widely divergent proportions of from 1 to 99% by weight are known for such types of composition. More desirably, they are in a weight ratio of from about 1:5 to 5:1, most preferably about 1:1 for use in the present compositions.

The present compositions may also contain conventional polymer additives. The additives, including: pigments, such as titanium dioxide; fire retardants, such as phosphorous compounds; and the like; perform in known manner without detracting from the improved appearance and properties of this invention.

The following examples are given by way of illustration only and are not intended as a limitation on the scope of this invention. Many variations are possible without departing from its spirit and scope. Unless otherwise specified herein, all proportions are provided on a weight basis.

EXAMPLE I

Poly(2,6-dimethyl-1,4-phenylene ether) is produced by polymerization in a biphasic reaction system. An aliquot of the medium is separated and methanol added to precipitate a first sample of polymer. The remainder of the medium is catalytically hydrogenated and then injected with steam to precipitate additional polymer. This additional polymer is divided into two more samples.

The three samples are admixed with equal weights of rubber modified polystyrene, 1% of tridecyl phosphite, 3% of triphenyl phosphate, 0.2% of zinc sulfide and 0.2% of zinc oxide. They are then (in admixture with other components as depicted in the Table below) blended and extruded in a 28 mm twin screw extruder having a barrel temperature of 300° C. The resultant extrudates are chipped and then molded in a Newbury 3 oz. injection machine. The moldings are analyzed for yellowness by the procedure of ASTM 1925, using a Kollmorgen Color-Eye. Thereafter sample moldings are exposed either to 115° C. temperature for eight days in an air oven or ultraviolet light (at a distance of 3 inches under 90 mils of window glass) for seven days to examine aging characteristics.

The results of these analyses are set forth below in Table I:

TABLE I

| | Color Changes of PPO—Polystyrene Blends | | | | | | |
|---|---|---|---|---|---|---|---|
| | Additives | | Color (Y.I.) | | | Increase in Color | |
| SAMPLE | TiO$_2$ | Benzoic Anhydride Per Polyphenylene | Initial 1st day | Temperature 8th day | UV Light 7th day | Temperature 8 days | UV Light 7 days |
| Methanol Precipitated, not decolorized | 10% | — | 4.3 | 13.6 | 6.8 | 9.3 | 2.5 |
| Steam precipitated and decolorized | 2% | — | 14.0 | 40.3 | 21.5 | 26.3 | 7.5 |
| Steam precipitated and decolorized | 10% | 4% | 3.3 | 18.5 | 8.6 | 15.2 | 5.5 |

These results show both an initial decrease in color and an increase in color stability for the present benzoic anhydride treated compositions.

EXAMPLE II

Poly(2,6-dimethyl-1,4-phenylene) ether is produced by reaction of 2,6-xylenol with oxygen in toluene solution, and a catalyst prepared from a mixture of cupric chloride, sodium bromide, and di-n-butyl amine. The solution is extracted with an aqueous solution of the trisodium salt of ethylenediaminetetraacetic acid to remove catalyst. A portion of the organic phase is mixed with methanol to precipitate the polymer. The polymer is then filtered off, washed with methanol and dried. A second portion is catalytically hydrogenated over a catalyst consisting of palladium on calcium carbonate, and the polymer is precipitated by injection with steam.

50 parts of the polyphenylene ether produced as described above, 50 parts of a rubber-modified polystyrene (Foster Grant 834), 3 parts of triphenyl phosphate, 5 parts of titanium dioxide, 1 part of tridecyl phosphite, 1.5 parts of polyethylene, 0.15 parts of zinc sulfide, 0.15 parts of zinc oxide, and 1.5 parts of benzoic anhydride are mixed together and extruded at about 300° C. in a 28 mm twin-screw extruder. The extruded pellets are molded into ⅛×2×2½ in. plates in a Newbury injection molding machine at a barrel temperature of 575° F. (302° C.). Similar molded samples are then prepared which lack the benzoic anhydride additive.

The initial colors (yellowness index; Y.I.) of the molded pieces are measured by the procedure of ASTM 1925, using a Kollmorgen Color-Eye. Some of the specimens are heated at 115° C. in a circulating air oven and the change in yellowness index is measured after six days. Other specimens are mounted on a rotating platform protected by 0.090" of ordinary window glass and exposed at a distance of three inches to a battery of fluorescent black-light lamps. The change in yellowness index is measured at one day intervals, and from a plot of the results the time required to produce an increase of one unit in yellowness index is estimated. The results are shown in Table II.

TABLE II

| Polyphenylene Ether | TiO$_2$ (phr) | Benzoic Anhydride (phr) | Initial Y.I. | Increase in Y.I. - 6 days at 115° | Increase in Y.I. - UV, 7 days | Days to Y.I. = fl UV, (days) |
|---|---|---|---|---|---|---|
| Precipitated with methanol, not decolorized | 5 | — | 14.1 | 4.9 | 4.4 | 4.5 |
| Precipitated with methanol, not decolorized | 5 | 1.5 | 14.0 | 5.1 | 4.4 | 5.5 |
| Decolorized, then steam precipitated | 5 | — | 4.1 | 19.0 | 9.1 | 2.1 |
| Decolorized, then steam precipitated | 5 | 1.5 | 3.8 | 4.8 | 4.9 | 4.5 |

EXAMPLE III

Poly(2,6-dimethyl-1,4-phenylene) ether is prepared in toluene solution and the catalyst is removed as described in Example II. The polymer solution, which is deep red in color, is passed through a three-foot column packed with activated alumina. This removes most of the colored impurities, yielding a straw-colored polymer solution. The polymer is then isolated by adding the polymer solution dropwise to a rapidly stirred vessel filled with water at a temperature of about 90° C. The precipitated polymer is filtered off, washed with water and dried.

A blend containing 50 parts of the polyphenylene ether, 50 parts of Foster-Grant 834 rubber-modified polystyrene, 3 parts of titanium dioxide, 1.5 parts of polyethylene, 1 part of tridecyl phosphite, 3 parts triphenyl phosphate, 0.15 parts of zinc sulfide and 1 part of benzoic anhydride are extruded and molded, as described in Example 2, into ⅛" color chips and standard tensile bars. A control blend is prepared in the same way without benzoic anhydride. The test specimens are heated at 115° C. in a circulating air oven. Change in color is measured after three days and after seven days. The ductility of the tensile bars is also measured at seven day intervals. The results are shown below in Table III:

TABLE III

| Blend | Initial Y.I. | Increase in Y.I. | | Ductility | | | | |
| | | 3 days | 7 days | 7 days | 14 days | 21 days | 28 days | 35 days |
|---|---|---|---|---|---|---|---|---|
| Control | 17.4 | 6.1 | 14.2 | ductile | brittle | brittle | — | — |
| 1 phr benzoic | | | | | | | | |

TABLE III-continued

| Blend | Initial Y.I. | Increase in Y.I. | | Ductility | | | | |
|---|---|---|---|---|---|---|---|---|
| | | 3 days | 7 days | 7 days | 14 days | 21 days | 28 days | 35 days |
| anhydride | 17.1 | 4.9 | 5.6 | ductile | ductile | ductile | ductile | ductile |

All of the foregoing patents and/or publications are incorporated herein by reference. Obviously, other modifications and variations of the present invention are possible in the light of the above teachings. For instance, instead of poly(2,6-dimethyl-1,4-phenylene)ether, copolymers such as poly(2,6-dimethyl-co-2,3,6-trimethyl-1,4-phenylene)ether can be used. The compositions can also include other ingredients, such as flame retardants, drip retardants, fillers, and/or reinforcements, antioxidants, pigments, in conventional amounts. It is, therefore, to be understood that changes may be made in the particular embodiments of the invention described which are within the full intended scope of the invention as defined by the appended claims.

I claim:

1. A thermoplastic composition having improved color properties, comprising the reaction product of polyphenylene ether with a minor amount of benzoic anhydride sufficient to improve the color or the color stability.

2. The composition of claim 1, wherein the concentration of benzoic anhydride is from 0.05 to 5% by weight of polyphenylene ether.

3. The composition of claim 2, wherein an admixture of polyphenylene ether and benzoic anhydride is subjected to treatment at a temperature of from 200° to 500° C. to produce the reaction product.

4. The composition of claim 3, wherein the treatment is performed by extruding the admixture.

5. The composition of claim 1, wherein the composition additionally contains from 1 to 99% of polyalkenyl aromatic resin by total weight.

6. The composition of claim 5, wherein the polyphenylene ether of the admixture is a decolorized polymer.

7. The composition of claim 6, wherein the polymer is obtained from a polymerization medium by a total isolation process.

8. A process for producing the composition of claim 1, comprising admixing polyphenylene ether with from 0.05 to 5% by weight of benzoic anhydride and subjecting said admixture to treatment at a temperature of from 200° to 500° C. to effect a color stabilizing reaction.

9. The process of claim 8, wherein the treatment is performed by extruding the admixture.

10. The process of claim 9, wherein the polyphenylene ether of the admixture is a decolorized polymer.

11. The process of claim 10, wherein decolorization is performed by catalytic hydrogenation.

12. The process of claim 10, wherein decolorization is performed by adsorption.

13. The process of claim 10, wherein the polymer is isolated from a polymerization medium by steam precipitation prior to admixing.

14. The process of claim 10, wherein the polymer is isolated from a polymerization medium by addition to hot water prior to admixing.

15. The process of claim 11, wherein the admixture is extruded with from 1 to 99% of polyalkenyl aromatic resin by total weight.

16. A thermoplastic composition characterized by improved color properties, comprising the reaction product of polyphenylene ether with from 0.05 to 5% by weight of benzoic anhydride.

* * * * *